United States Patent [19]

Ueno et al.

[11] 4,008,372
[45] Dec. 15, 1977

[54] TV CAMERA

[75] Inventors: Atsushi Ueno; Kiyoharu Sakai; Showhey Fujimoto, all of Tenri, Japan

[73] Assignee: Sharp Kabushiki Kaisha, Osaka, Japan

[22] Filed: Dec. 1, 1975

[21] Appl. No.: 636,423

[30] Foreign Application Priority Data

Nov. 28, 1974 Japan .......................... 49-137171
Nov. 29, 1974 Japan .......................... 49-139708
Nov. 29, 1974 Japan .......................... 49-139710
Nov. 29, 1974 Japan .......................... 49-139711

[52] U.S. Cl. .............................. 358/227; 358/228; 358/229
[51] Int. Cl.² ........................................ H04N 1/03
[58] Field of Search ................ 178/7.8, 7.81, 7.91, 178/7.92, 7.1, DIG. 1, DIG. 38; 354/289, 293; 358/41

[56] References Cited

UNITED STATES PATENTS 3,164,838   1/1965   Heinrich ........................... 354/293
3,573,367   4/1971   LaRue ............................. 178/7.92

OTHER PUBLICATIONS

M. A. Mayers, "Closed Circuit TV", 1957, pp. 183, 212–213.

*Primary Examiner*—Benedict V. Safourek
*Assistant Examiner*—Edward L. Coles
*Attorney, Agent, or Firm*—Birch, Stewart, Kolasch and Birch

[57] ABSTRACT

A TV camera wherein both the lens and its control system are completely enclosed in a casing of the camera to protect them from dust, dirt and damage. Massive control knobs are secured on the side wall of the casing for controlling the focus and the zoom. The iris is cable driven by a linear control mounted on the side wall of the casing and the indication of the iris setting is provided on the rear control panel having a viewfinder. A self-balancing cradle mount supports the camera slightly above its center of gravity. Independent pan and tilt friction adjustments can lock the camera in any desired position. A pan and tilt handle is located at the rear of the control panel.

10 Claims, 15 Drawing Figures

TV CAMERA

BACKGROUND AND SUMMARY OF THE INVENTION

The present invention relates to a TV camera and, more particularly, to mechanical construction of a TV camera.

A conventional TV camera is mounted on a universal head secured on the top of a tripod. Pan and tilt movements are achieved by handling the universal head. In this arrangement, the center of gravity of the TV camera is unavoidably positioned above its supporting head, or, the universal head and, therefore, there is every possibility that the camera will be damaged because of rapid movements of the camera or undesirable movements of the camera.

In a conventional TV camera, the lens is extruded from a casing of a camera, at which an iris control is mounted. It was required that both the lens and its control system are completely enclosed in the casing of the camera to protect them from dust, dirt and damage with an arrangement which enables the operator to adjust the iris setting and recognize indication of the iris setting at the back of the TV camera.

Accordingly, an object of the present invention is to provide a TV camera of which the lens and its control system are completely enclosed in a casing of the camera.

Another object of the present invention is to provide a novel support system of a TV camera.

Still another object of the present invention is to provide a TV camera wherein the lens control is positioned at the back of the TV camera where its operation is readily achieved by the operator.

Yet another object of the present invention is to provide a cable driven adjustment system in a TV camera for performing the adjustment of the focus, zoom and iris setting.

A further object of the present invention is to provide a remote iris setting meter in a TV camera.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objectives, pursuant to an embodiment of the present invention, both the lens and its control system are completely enclosed in a casing of a camera to protect them from dust, dirt and damage. A self-balancing cradle mount supports the TV camera slightly above its center of gravity. Independent pan and tilt friction adjustments can lock the TV camera in any desired position. A pan and tilt handle is located at the rear of the control panel positioned at the back of the TV camera.

Massive control knobs are secured on the both side walls of the casing of the TV camera for adjusting the focus and the zoom through cables and pulleys. A linear control is mounted on the side wall of the casing in order to drive an iris setting via a cable. To provide the operator with a quick, convenient indication of the iris setting, a remote iris setting meter associated with the cable connected with the linear control is secured on the control panel.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
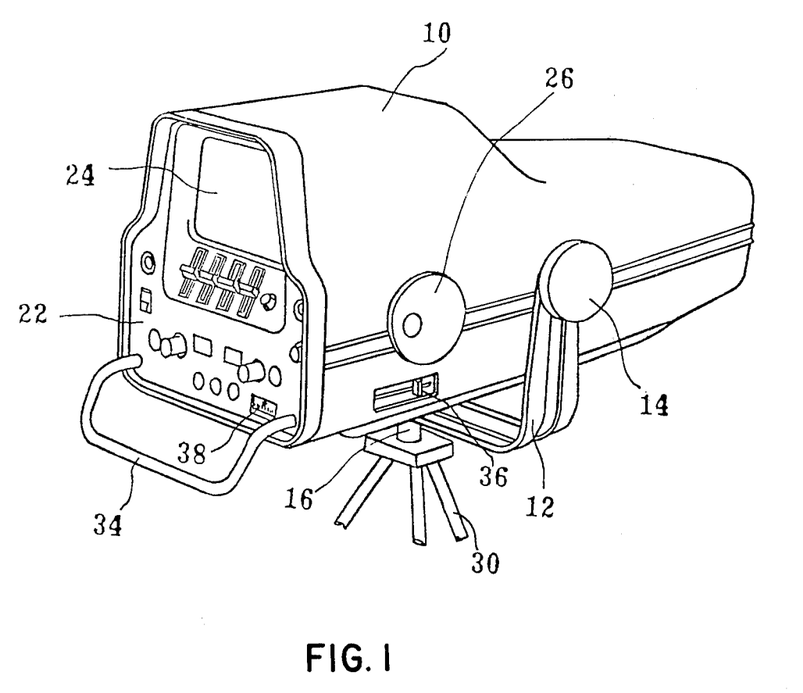
FIG. 1 is a perspective view of an embodiment of a TV camera of the present invention.
Figure 2:
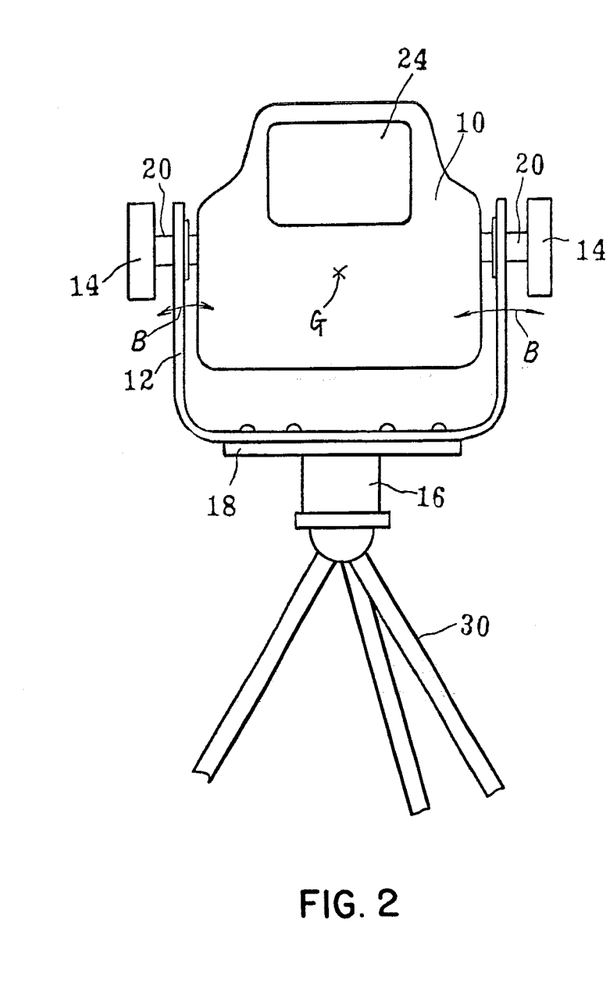
FIG. 2 is a schematic rear elevation of the TV camera of FIG. 1.
Figure 3:
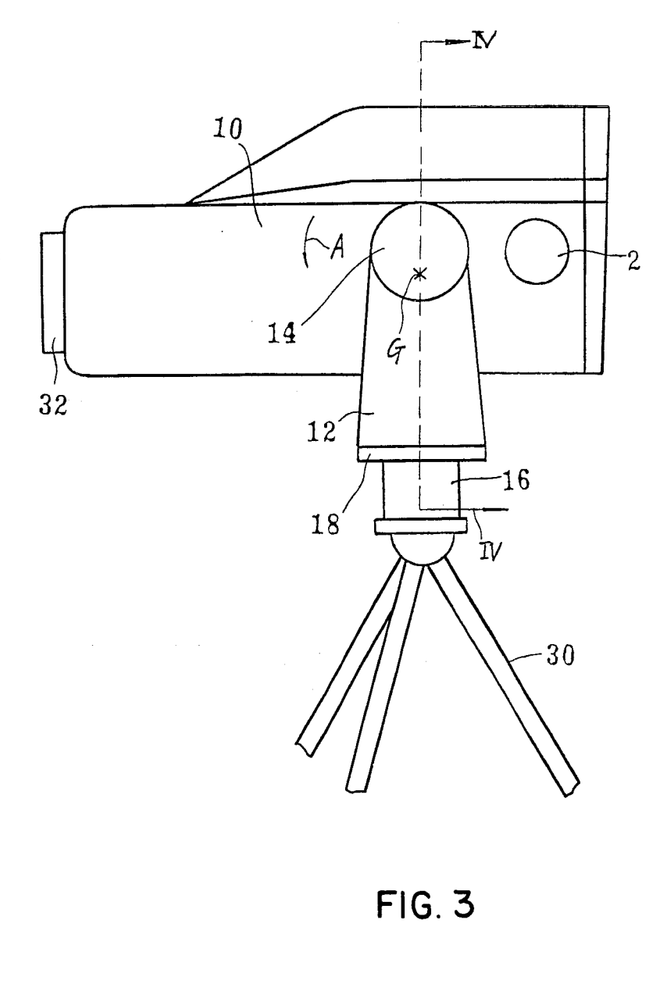
FIG. 3 is a schematic side view of the TV camera of FIG. 1.

Referring now to FIGS. 1, 2 and 3, there is illustrated an embodiment of a TV camera of the present invention, which comprises a casing 10, a pan and tilt cradle 12, tilt lock knobs 14, a pan head 16 and a flange 18.

The casing 10 is tiltably secured around a shaft 20 and tilt friction adjustment is achieved through the tilt lock knobs 14. When the tilt lock knobs 14 are fastened, the pan and tilt cradle 12 is bent in the direction shown by the arrow B of FIG. 2. To prevent an undesirable tilt of the casing 10 in the direction shown by the arrow A FIG. 3, the flange 18 is disposed between the pan and tilt cradle 12 and the pan head 16 in order to reinforce the bottom portion of the pan and tilt cradle 12.

The shaft 20 is positioned slightly above the center of gravity G of the casing 10 and, therefore, the rapid tilt of the casing 10 and the undesirable movement of the casing 10 can be prevented. Needless to say, circuit and optical elements of the TV camera are so positioned that their center of gravity are positioned below the shaft 20.

The TV camera further comprises a control panel 22, a viewfinder 24 at the rear of the casing 10, a zoom control knob 26, a lens focus control knob 28 at the side walls of the casing 10, and a tripod 30. A lens hood 32 is positioned in front of the casing 10 to protect the lens unit from damage, whereas a pan and tilt handle 34 is located at the rear of the control panel 22. A linear control 36 is mounted on the side wall of the casing 10 to adjust an iris setting and a remote iris setting meter 38 provides the operator with a quick, convenient indication of the iris setting.

Detailed construction of a support system including the pan and tilt cradle 12 and the tilt lock knobs 14, a lens control system inclusive of the zoom control knob 26 and the lens focus control knob 28, and an iris setting system inclusive of the linear control 36 and the remote iris setting meter 38 will be described hereinbelow.

SUPPORT SYSTEM

Figure 4:
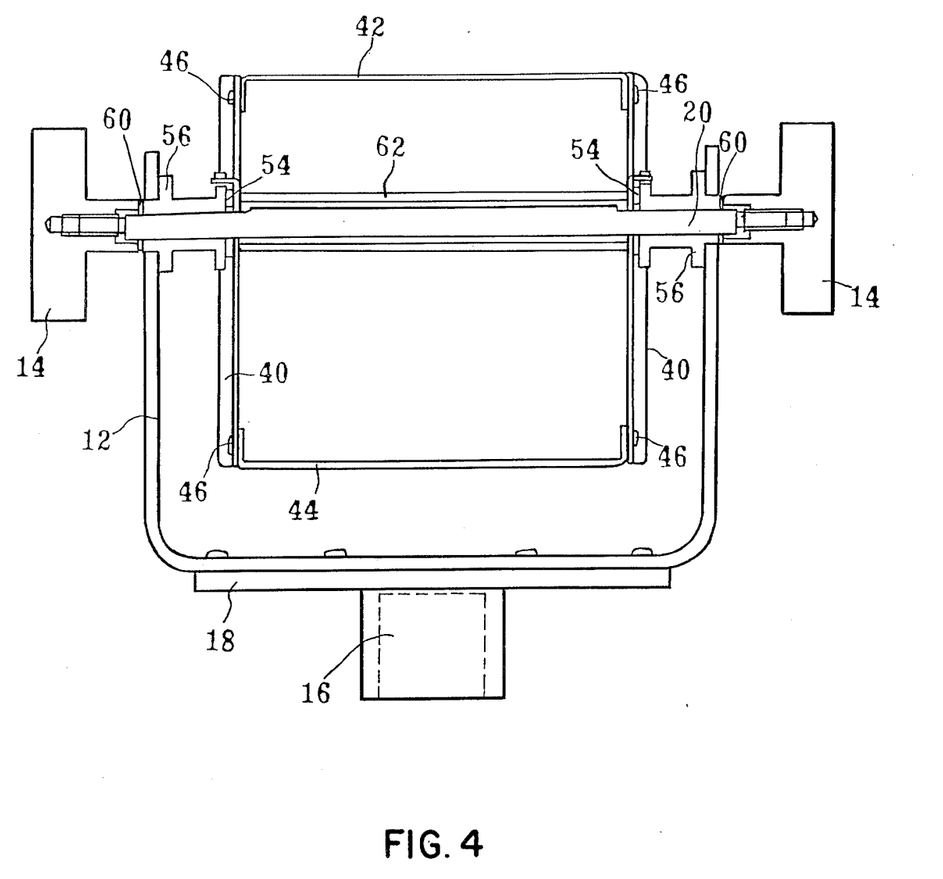
FIG. 4 is a cross sectional view as seen at IV—IV of FIG. 3.
Figure 5:
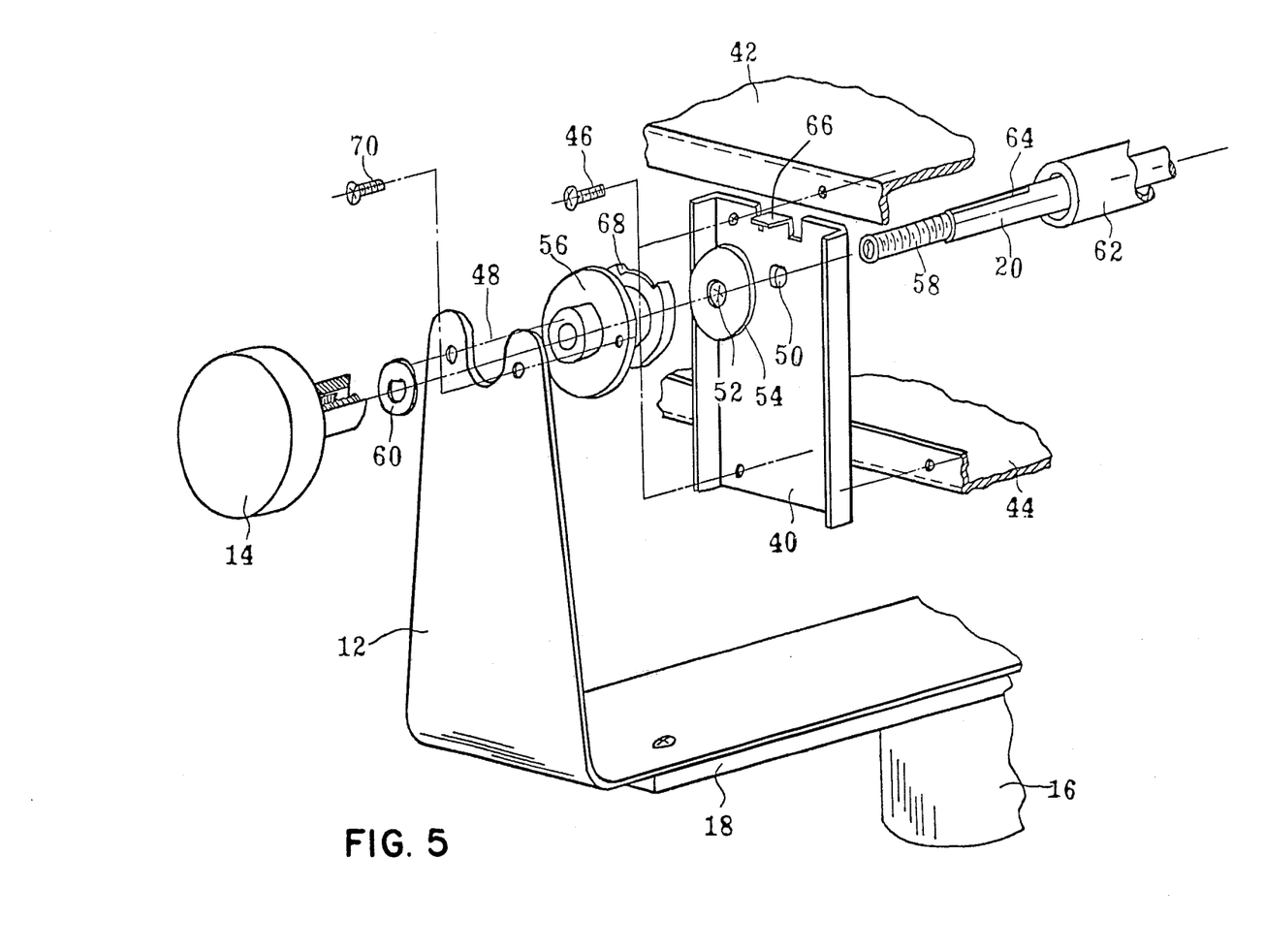
FIG. 5 is an exploded view of an essential part of a support mechanism of the TV camera of FIG. 1.

FIGS. 4 and 5 show the support system including the pan and tilt cradle 12, the shaft 20 and the tilt lock knobs 14. In these drawings, the casing 10 and the optical and electrical components secured in the casing 10 have been omitted for the purpose of simplicity.

Angles 40 are secured between the both side ends of an upper chassis 42 and a bottom chassis 44 through the use of screws 46. Both ends of the shaft 20 are rotatably secured in recesses 48 provided on both ends of the pan and tilt cradle 12 via semicircular holes 50 formed through the angles 40, holes 52 formed at the center of friction plates 54, and bearings 56. The tilt lock knobs 14 are secured at the both ends of the shaft 20, at which screws 58 are formed, via semicircular rings 60. A pipe 62 is secured around the middle portion of the shaft 20 in such a manner as to contact the angles 40 in order to prevent the upper and bottom chassis 42, 44 and the angles 40 from being bent when the tilt lock knobs 14 are fastened. Flat portions 64 are formed adjacent to the screws 58.

The flat portions 64 are confronted with the flat portions of the semicircular holes 50 formed through the angles 40 and the semicircular rings 60.

Therefore, the shaft 20 can not rotate with respect to the angles 40 and the tilt lock kobs 14. When the tilt lock knobs 14 are fastened, the body of the TV camera including the angles 40 and the upper and bottom chassis 42 and 44 is tightly supported, or, is prevented from the rotation around the shaft 20 via the friction plates 54, because the both ends of the pan and tilt cradle 12 are bent slightly inward.

The angle 40 has a projection 66 at the top edge thereof, which cooperates with a notch 68 formed on the bearing 56 to prevent the body of the TV camera from the extra rotation. As discussed above, the shaft 20 can not rotate with respect to the tilt lock knobs 14 by the provision of the semicircular rings 60. Therefore, there is no possibility that the tilt lock knobs 14 are erroneously unfastened during the tilt operation of the TV camera. The bearings 56 are fixed to the both ends of the pan and tilt cradle 12 through the use of screws 70.

LENS CONTROL SYSTEM

Figure 6:
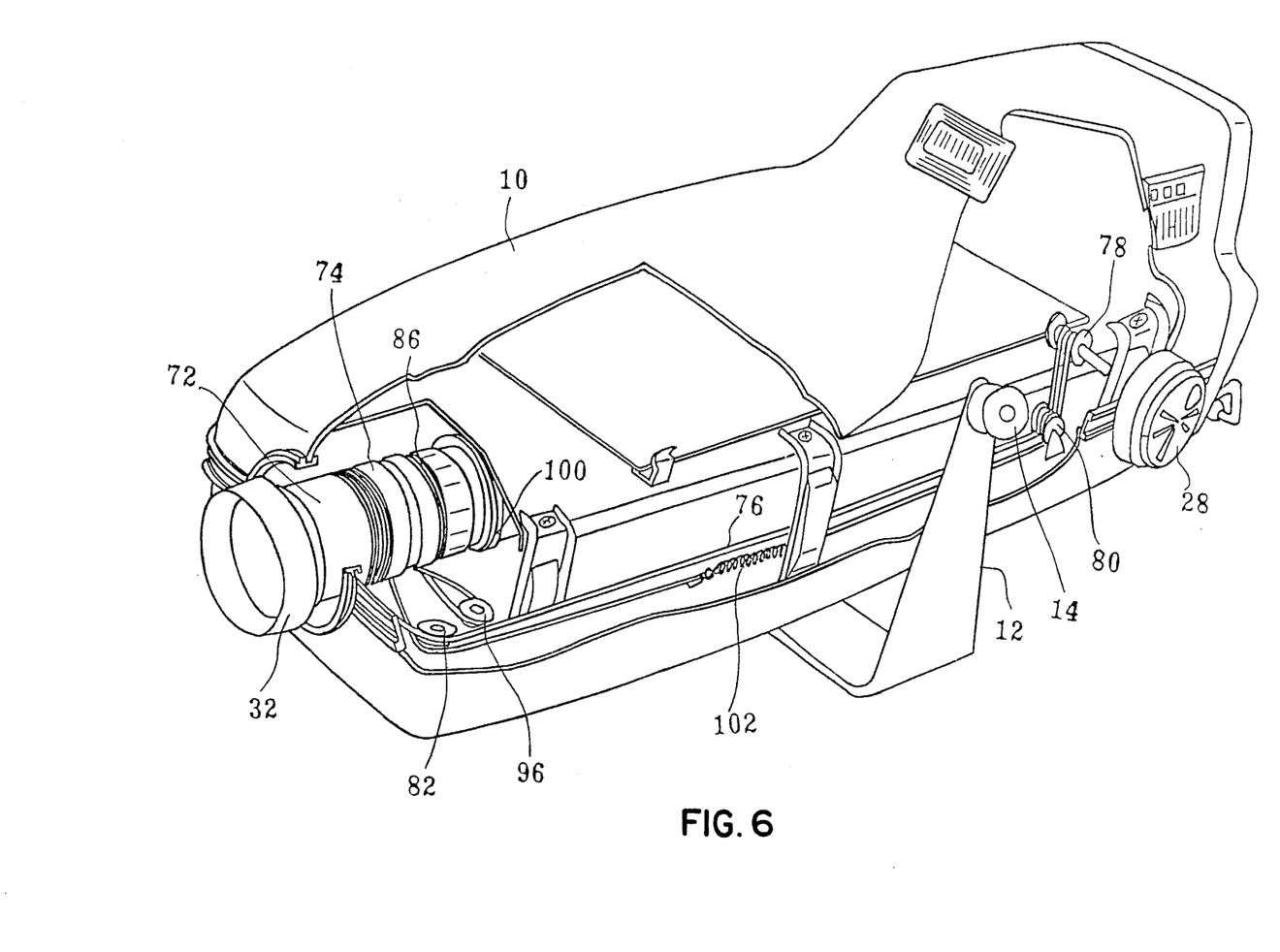
FIG. 6 is a partially cutaway perspective view of the TV camera of FIG. 1.
Figure 7:
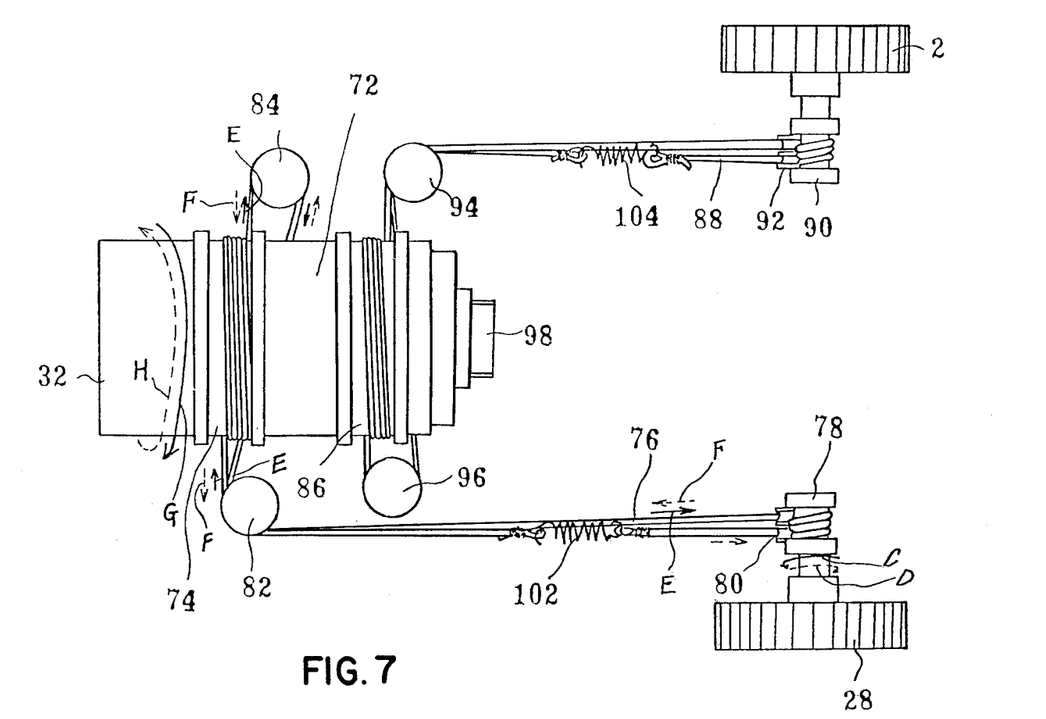
FIG. 7 is a plan view of a lens control system of the TV camera of FIG. 1.
Figure 8:
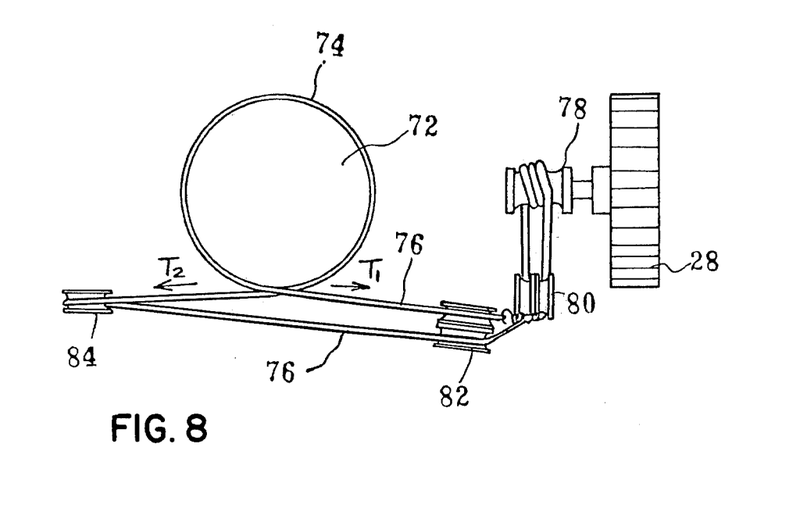
FIG. 8 is a schematic front view of the lens control system of FIG. 7.

FIGS. 6, 7 and 8 show the lens control system including the zoom control knob 26 and the lens focus control knob 28. In these drawings, the detailed construction of the already discussed support system and the electrical components secured in the casing 10 have been omitted for the purpose of simplicity.

A lens system 72 is enclosed in the casing 10 except for the lens hood 32. The lens focus control knob 28 is connected to a focus control ring 74 via a wire 76 and pulleys 78, 80, 82 and 84. The zoom control knob 26 is connected to a zoom control ring 86 via a wire 88 and pulleys 90, 92, 94 and 96.

A screw portion 98 is provided at the rear end of the lens system 72 to fix the lens system 72 to a mounting portion 100.

When the lens focus control knob 28 is rotated in the direction shown by an arrow C in FIG. 7, a tractive force is effected on the wire 76 in the direction shown by an arrow E via the pulleys 78 through 84. The wire 76 is wound around the focus control ring 74 in desirable turns and, therefore, the focus control ring 74 is rotated in a direction shown by an arrow G by a friction force created between the wire 76 and the focus control ring 74. The number of turns of the wire 76 wound around the focus control ring 74 is selected at a value suitable to creat a desirable friction force between the wire 76 and the focus control ring 74. The diameter of the pulley 78 is selected smaller than that of the focus control ring 74, thereby permitting the wire 76 to slip around the pulley 78 when the focus control knob 28 is rotated beyond the allowed turns in order to prevent the lens system 72 from being damaged.

When the focus control knob 28 is rotated in a direction shown by an arrow D in FIG. 7, the wire 76 is attracted in a direction shown by an arrow F and hence the focus control ring 74 is rotated in a direction H. When the lens system 72 is rotated in the direction H beyond the allowed turns, there is the possibility that the screw portion 98 is released from the mounting portion 100. To prevent the above accident, a spring 102 is disposed between the wire 76 in such a manner as to make the attraction force in the direction F smaller than the attraction force in the direction E when the focus control knob 28 is rotated in the directions B and A, respectively.

The zoom control is achieved in the same manner as for the focus control. A spring 104 disposed between the wire 88 acts in a same manner as that achieved by the spring 102, that is, the spring 104 is effective to prevent the lens system 72 from being erroneously disconnected from the mounting portion 100.

The pulleys 82 and 84 function to direct tension $T_1$ and $T_2$ caused by the wire 76 in the same direction but opposing orientation. That is, the direction of the tension $T_1$ has about an 180° angle with respect to that of the tension $T_2$, thereby preventing the lens system 72 from damage when the focus control knob 28 is rotated.

IRIS SETTING SYSTEM

Figure 9:
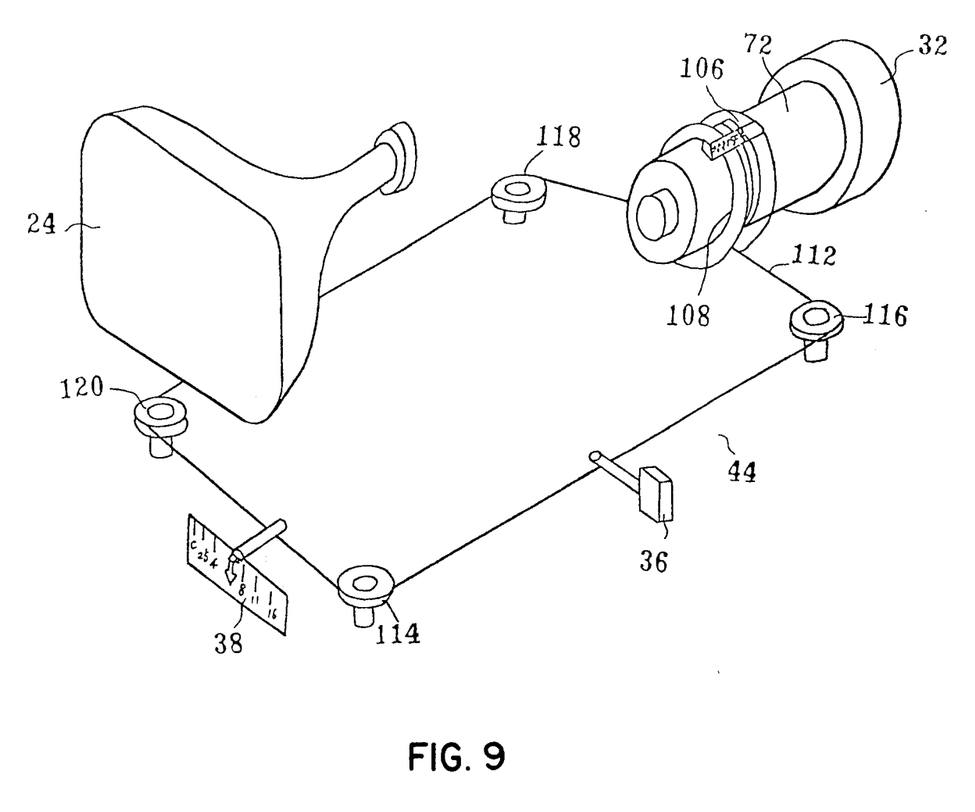
FIG. 9 is a schematic perspective view of an iris adjustment system of the TV camera of FIG. 1.
Figure 10:
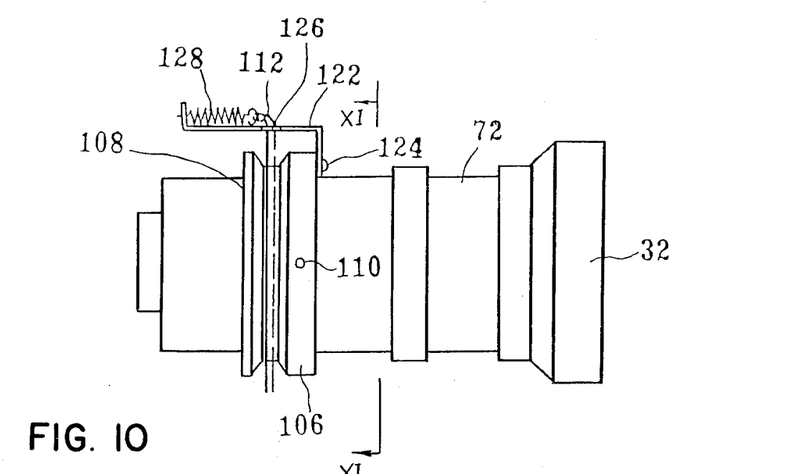
FIG. 10 is a side view of an essential part of the iris adjustment system of FIG. 9.
Figure 11:
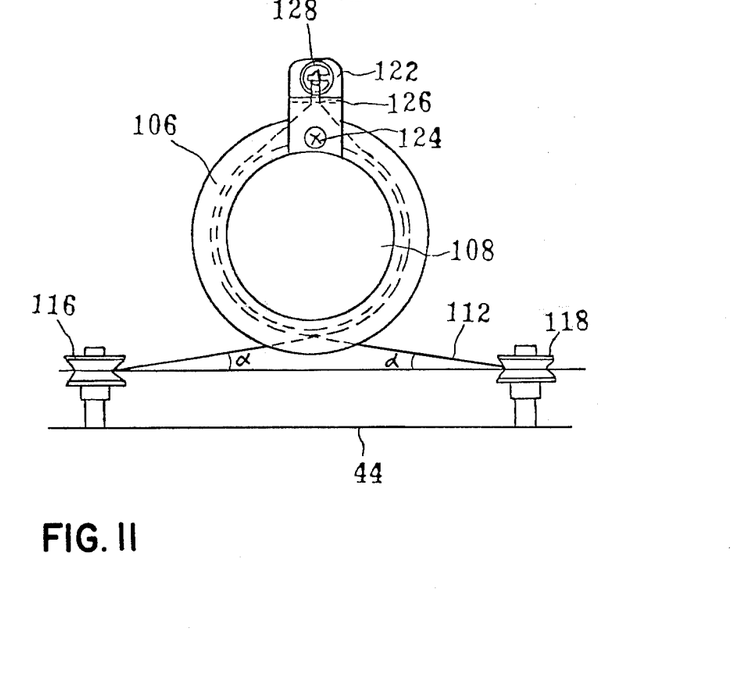
FIG. 11 is a cross sectional view as seen at XI—XI of FIG. 10.

FIGS. 9, 10 and 11 show the iris setting system including the linear cntrol 36 and the remote iris setting meter 38. In these drawings, the casing 10, the electrical components secured in the casing 10, the support system and the lens control system have been omitted for the purpose of simplicity.

An operation ring 106 is fixed around an iris ring 108 via a screw 110. A wire 112 connects the linear control 36 with the operation ring 106 via pulleys 114, 116 118 and 120 rotatably secured on the bottom chassis 44. An angle 122 is fixed to the operation ring 106 through the use of a screw 124. A portion of the wire 112 wound around the operation ring 106 is extruded through a hole 126 formed through the angle 122 and connected to one end of a spring 128, the other end of the spring 128 being fixed to the angle 122. The spring 128 functions to straighten the wire 112.

The remote iris setting meter 38 is connected to a midle portion of the wire 112, whereby the remote iris setting meter 38 indicates the iris setting in response to the variation of the iris setting driven by the linear control 36.

It will be clear that the iris setting meter can be electrically implemented by connecting the linear control 36 to a suitable variable resistor.

It will be clear from FIG. 11 that the lens system 72 will not be damaged when the wire 112 is wound around the operation ring 106 in such a manner that the angles α in FIG. 11 approximate zero. The spring 128 will not be damaged because the spring 128 receives the same tension when the linear control 36 is driven in either direction. Therefore, the iris setting system can perform an accurate operation.

HOUSING

Figures 12, 13:
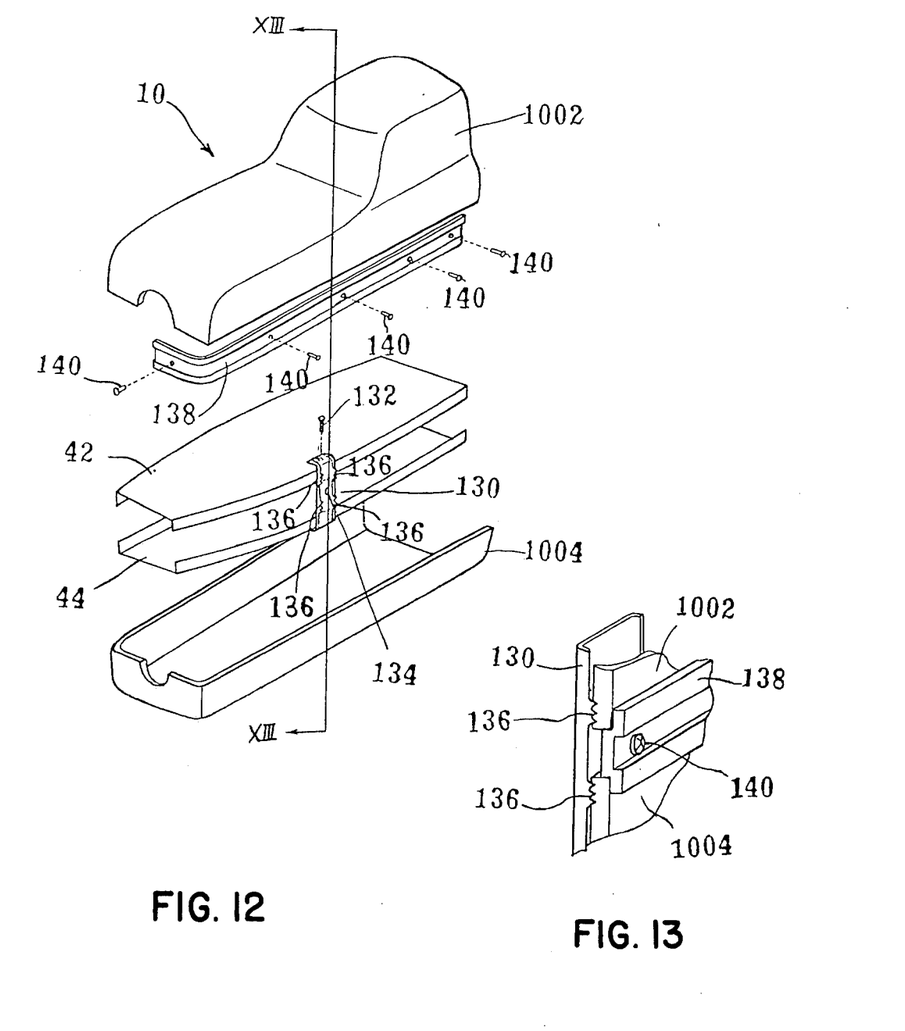
FIG. 12 is an exploded view of an essential part of an embodiment of a housing of the TV camera of FIG. 1.
FIG. 13 is a perspective view of an essential part of the housing as seen a XIII—XIII of FIG. 12.

FIGS. 12 and 13 show an embodiment of a housing of a TV camera of the present invention. The upper chassis 42 and the bottom chassis 44 on which the optical and electrical components, which have been omitted from the drawings for the purpose of simplicity, are mounted are connected with each other through the use of C-shaped angles 130 and screws 132. Each C-shaped angle 130 has a hole 134 and four crimped projections 136. Junction belts 138 are fixed to the C-shaped angles 130 through the use of screws 140 and the holes 134. An upper casing 1002 and a bottom casing 1004 are secured between the C-shaped angles 130 and the junction belts 138, and then tightly cling to the crimped projections 136 when the screws 140 are fastened.

Figure 14:
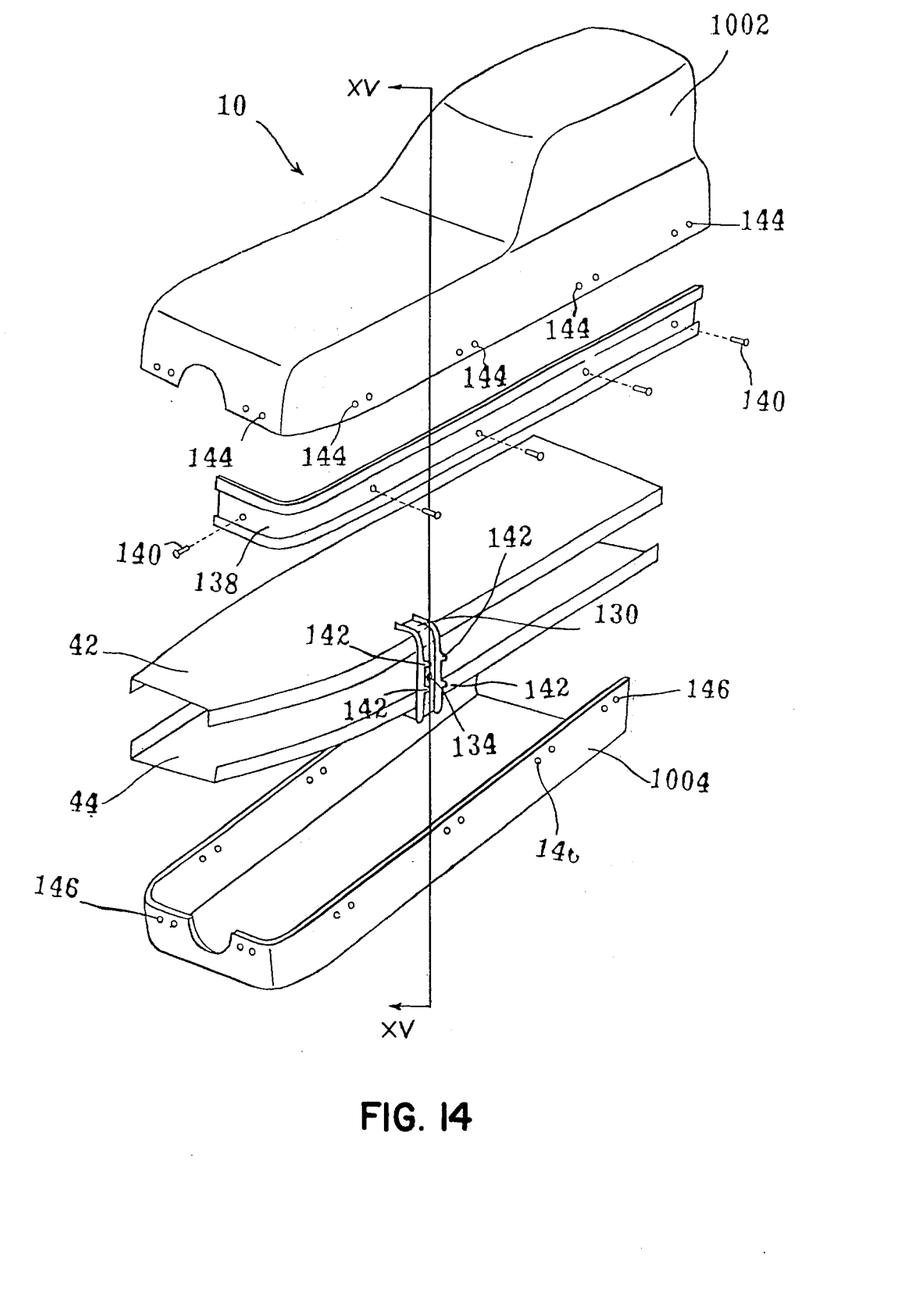
FIG. 14 is an exploded view of an essential part of another embodiment of a housing of the TV camera of FIG. 1.
Figure 15:
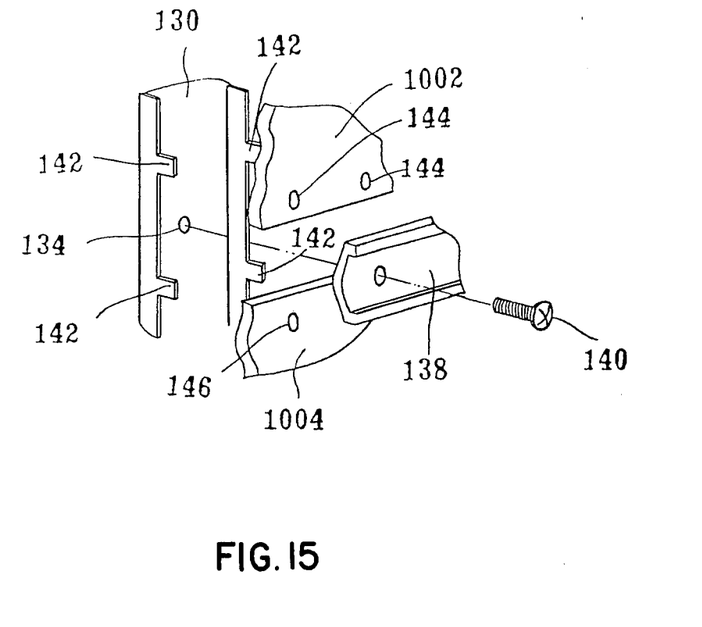
FIG. 15 is an exploded perspective view of an essential part of the housing as seen at XV—XV of FIG. 14.

FIGS. 14 and 15 show another embodiment of a housing of a TV camera of the present invention. Like elements corresponding to those of FIGS. 12 and 13 are indicated by like numerals. Four projections 142 are provided on the C-shaped angle 130, whereas holes 144 and 146 are formed through the upper casing 1002 and the bottom casing 1004, respectively, which confront the projections 142. The upper and bottom casings 1002 and 1004 are secured around the upper and bottom chassis 42 and 44 by inserting the projections 142 into the holes 144 and, thereafter, tightly fixed by the junction belts 138 and the screws 140.

The invention being thus described, it will be obvious that the same way be varied in many ways. Such variations are not to be regarded as a departure from the spirit and scope of the invention, and all such modifications are intended to be included within the scope of the following claims.

What is claimed is:

1. A TV camera comprising a casing surrounding a body of the TV camera, electrical and optical components enclosed in the casing, and support means for supporting the body of said TV camera and for providing the body with pan and tilt movements, said support means comprising a shaft provided through the body of the TV camera at a position slightly above its center of gravity and means for rotatably supporting said shaft.

2. A TV camera comprising a casing surrounding a body of the TV camera, electrical and optical components enclosed in the casing, and support means for supporting the body of the TV camera and for providing said body with pan and tilt movements, said support means comprising a pan and tilt cradle; a shaft provided through the body of the TV camera at a position slightly above its center of gravity; a first mounting means for mounting the body of the TV camera on said shaft; and a second mounting means for rotatably mounting said shaft on the pan and tilt cradle, thereby providing the body of the TV camera with said tilt movement.

3. The TV camera of claim 2, which further comprises means for preventing the body of the TV camera from rotation with respect to said shaft.

4. The TV camera of claim 2, which further comprises tilt lock knobs secured on the side walls of the casing and associated with said shaft, whereby a tilt friction adjustment is achieved through said tilt lock knobs.

5. The TV camera of claim 2, which further comprises a pan head for rotatably supporting the pan and tilt cradle, thereby providing the body of the TV camera with the pan movement; and a flange attached to the bottom plate of the pan and tilt cradle in order to reinforce the bottom portion of the pan and tilt cradle.

6. In a TV camera which comprises a casing surrounding the body of the TV camera, electrical and optical components enclosed in the casing, and support means for supporting the body of the TV camera and providing the body of the TV camera with pan and tilt movements, said support means including a pan and tilt cradle; a shaft provided through the body of the TV camera at a position slightly above its center of gravity; a first mounting means for mounting the body of the TV camera on said shaft; and a second mounting means for rotatably mounting said shaft on the pan and tilt cradle, thereby providing the body of the TV camera with said tilt movement, the improvement which comprises:
   a lens system containing a hood therefor, said lens system being completely enclosed in the casing;
   a focus control ring disposed in the lens system;
   a focus control knob secured on the side wall of the casing; and
   a wiring means for connecting the control ring to the control knob, thereby rotating the control ring in response to the rotation of the control knob.

7. The TV camera of claim 6, wherein said wiring means comprises a cable, a portion of which is wound around the focus control ring; and pulleys for straightening the cable led out from the wound portion in opposing orientations.

8. The TV camera of claim 6, which further comprises a spring means disposed in the wiring means for reducing the attraction force to rotate the control ring in a direction to release the lens system from its mounting portion, thereby preventing an erroneous disconnection of the lens system from its mounting portion.

9. In a TV camera which comprises a casing surrounding a body of the TV camera, electrical and optical components enclosed in the casing, and support means for supporting the body of the TV camera with pan and tilt movements, said support means including a pan and tilt cradle; a shaft provided through the body of the TV camera at a position slightly above its center of gravity; a first mounting means for mounting the body of the TV camera on said shaft; and a second mounting means for rotatably mounting said shaft on the pan and tilt cradle, thereby providing the body of the TV camera with said tilt movement, the improvement which comprises:

a lens system containing a hood therefor, said lens system being completely enclosed in the casing;

an iris control ring disposed in the lens system;

an iris control lever secured on the side wall of the casing; and a wiring means for connecting the control ring to the control lever, thereby rotating the control ring in response to the shift operation of the control lever.

10. The TV camera of claim 9, which further comprises an indication means associated with the wiring means for providing an indication of the iris setting.

* * * * *

UNITED STATES PATENT AND TRADEMARK OFFICE
CERTIFICATE OF CORRECTION

PATENT NO. : 4,008,372
DATED : February 15, 1977
INVENTOR(S) : Atsushi UENO et al It is certified that error appears in the above-identified patent and that said Letters Patent are hereby corrected as shown below:

IN THE HEADING CONCERNING THE ISSUE DATE OF PATENT, change "[45] Dec. 15, 1977" to read -- [45] Feb. 15, 1977 --

UNDER THE HEADING,

"[30] Foreign Application Priority Data"

delete "Nov.28, 1974   Japan......................49-137171"

Signed and Sealed this

Twenty-ninth Day of November 1977

[SEAL]

*Attest:*

RUTH C. MASON
*Attesting Officer*

LUTRELLE F. PARKER
*Acting Commissioner of Patents and Trademarks*